United States Patent Office 3,287,427
Patented Nov. 22, 1966

3,287,427
DISPROPORTIONATION OF CYCLIC OLEFINS
Frederick J. Karol, Somerset, and Wayne L. Carrick, East Brunswick, N.J., assignors to Union Carbide Corporation, a corporation of New York
No Drawing. Filed Jan. 30, 1964, Ser. No. 341,398
14 Claims. (Cl. 260—666)

This invention relates to the disproportionation of cyclic olefins and to catalysts which effect this reaction.

Paladium and platinum are well known in the chemical and petroleum fields as hydrogenation and dehydrogenation catalysts. Palladium has also been used as a catalyst for the disproportionation of cyclic olefins which involves both hydrogenation and dehydrogenation. For these reactions, the catalysts are generally used in a carefully prepared, finely divided active form of the free metal alone or on various supports such as calcium carbonate, barium carbonate, alumina or silica. Platinum on a support is used in one step of petroleum refining, referred to as hydroforming or platforming, for the dehydrogenation of saturated cyclic aliphatic compounds. Here, hydrogen is given off as a by-product. For the reverse process, hydrogenation, palladium or platinum catalysts are used with gaseous hydrogen under superatomspheric pressures.

Numerous methods are known for the preparation of these catalysts. For example, platinum black is prepared by the reduction of chloroplatinic acid by means of 40 percent formaldehyde in an aqueous caustic solution. Palladium black may be prepared by the reduction of palladium salts with formaldehyde, hydrazine hydrate or carbon monoxide. However, the procedures extant for the preparation of these catalysts are tedious and have been troublesome in that these catalysts vary in activity due to the preparative procedure itself or the nature of the support or both.

It has now been discovered that contacting cyclic olefins with a simple halide of a platinum metal provides a facile means for the disproportionation of cyclic olefins in quantitative yields. The term "platinum metals" is defined by N. V. Sidgwick in "Chemical Elements and Their Compounds," volume 11, page 1317, Oxford University Press, London (1950), as a sub-group of Group VIII of the Deming Periodic Table comprising platinum, palladium, iridium, rhodium, ruthenium and osmium. Palladium halides are the preferred platinum metal halides in the invention, but others including platinum halides can also be used if desired. Any of the halides, fluorine, chlorine, bromine or iodine can be used as the anion in this catalyst although the chloride is preferred because of its activity and availability. This disproportionation reaction may take place as indicated by the equations below starting with cyclohexene as substrate and palladium dichloride as catalyst. This stoichiometric scheme is conjectural and this invention is not liimted to it.

(1)
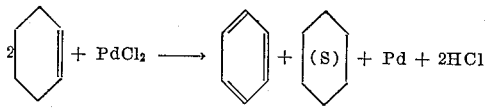

(2)
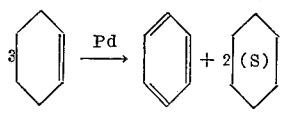

The first step, shown in Equation 1, involves the disproportionation of two moles of cyclohexene to form one mole of benzene and one mole of cyclohexane. The palladium dichloride catalyst is reduced to metallic palladium and hydrogen chloride. The metallic palladium thus formed being itself a highly active catalyst for this reaction, permits the further disproportionation of cyclohexene, the stoichiometry as shown in Equation 2 being 3 moles of cyclohexene affording 1 mole of benzene, and 2 moles of cyclohexane.

No elaborate catalyst preparations are involved for this reaction, the metal halide being used without any pretreatment. An unexpected aspect of the invention was revealed in finding that free metal was formed during the reaction process and is an active catalyst for the disproportionation. The free metal can be separated from the reaction zone and reused not only to effect disproportionation of additional cyclic olefin but also for conventional hydrogenations of olefins in general with gaseous hydrogen. This discovery then can be viewed not only as a useful method for the production of aromatics and saturated cyclic aliphatics by the disproportionation of a cyclic olefin by a platinum metal halide, but also as a useful method for the production of catalytically active metals. It should be noted that in this invention, no gaseous hydrogen is added to the reaction system since hydrogenation is conducted by a hydrogen transfer mechanism somewhat analogous to that observed, but not completely understood in biochemical processes. This system has the advantage of obviating the need for expensive high pressure equipment since the reaction proceeds rapidly at atmospheric pressure.

In addition to the obvious utility of this method for producing and purifying bulk industrial chemicals, both aromatic and alicyclic, it also provided a useful technique for the synthesis of pharmaceutical compounds in which the formation of reduction of olefinic bonds has significant effects on biological properties.

No solvent is generally employed in this reaction, but inert olefinic hydrocarbons such as pentane, hexane, heptane, octane, isooctane and the like can be used if desired.

The catalytic process of this invention does not require a heterogeneous support; however, for some purposes a support may be desirable. In these cases, a finely divided and catalytically active platinum metal may be prepared in supported form simply by carrying out the reaction between the olefin and platinum halide as described above in the presence of the desired support.

The cyclic olefinic substrates which are within the scope of the invention include both substituted and unsubstituted mono- and polyunsaturated cyclic olefins having six carbon atoms in each ring structure. Thus, for example, the mono-unsaturated cyclic olefins are cyclohexene or substituted cyclohexenes. The degree of substitution is limited only by the requirements that sufficient sites be available in the ring structure of the cyclic olefin to permit hydrogen transfer.

Polyunsaturated cyclic olefins are exemplified by cyclohexadiene, vinyl cyclohexene, dipentene, and the like.

Polynuclear cyclic olefins such as dihydronaphthalene, tetra hydronaphthalene, dihydroanthracene, tetrahydroanthracene, tetrahydrophenanthrene, and the like can also be used as substrates in this reaction.

When the aliphatic substituents on the cyclic olefin rings have 2 or 3 carbon atoms and are themselves unsaturated, they are hydrogenated during the disproportionation reaction. Thus, for example, when 4-vinylcyclohexene-1 undergoes this reaction, the products are ethylcyclohexane and ethylbenzene, as postulated below:

(3)

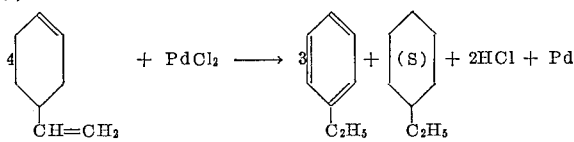

(4)

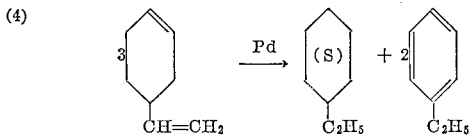

Other examples of unsaturated substituents which react similarly are the allyl, isopropenyl, 1-propenyl and ethylnyl side groups. Thus, the products of the disproportionation of dipentene are p-cymene and 4-isopropyl-1-methylcyclohexane as shown below:

(5)

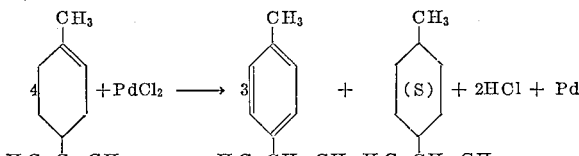

(6)

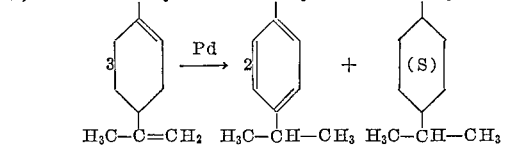

The invention is illustrated by the examples below. Unless otherwise specified, all parts and percentages given are by weight.

*Example 1.—Disproportionation of cyclohexene*

Ten ml. (0.099 mole) of cyclohexene was added to a 50 ml. 3 neck round-bottom flask equipped with a magnetic stirrer, thermometer and reflux condenser followed by the addition of 2.0 g. (0.011 mole) of palladium dichloride. The contents of the reaction flask were heated to reflux temperature (80–81° C.) with vigorous stirring. This temperature was maintained for two hours during which period a black precipitate of palladium metal formed with the liberation of hydrogen chloride. The reaction flask was cooled, its contents filtered free of solid material and the filtrate subjected to analysis by means of vapor phase chromatography using a column consisting of 2% Carbowax on a Haloport support. Carbowax is the trade name for polyethylene glycol having a molecular weight of about 20,000. Haloport is the trade name for a normally solid polymer of tetrafluoroethylene. The sole organic products of this experiment were shown to be present in a molar ratio of 65% cyclohexane and 35% benzene. The catalytic action of the palladium was demonstrated by the fact that 9 moles of cyclohexene were converted per mole of palladium dichloride.

*Example 2.—Disproportionation of 4-vinylcyclohexene-1*

Ten milliliters (0.075 mole) of 4-vinylcyclohexene-1 was charged to a 50 ml. 3 neck, round-bottom flask equipped with a magnetic stirrer, a thermometer and a reflux condenser together with 2.0 g. (0.011 mole) of palladium dichloride. The reactants were vigorously stirred while heating at 135° C. for 30 minutes, during which period a black solid formed and hydrogen chloride was evolved as demonstrated by a positive reaction with blue litmus paper. The contents of the reaction flask were cooled, filtered free of solids and the constituents of the fitrate identified by examination of its infrared absorption spectrum and vapor phase chromatogram. For the latter analytical technique a 2% Carbowax on a Haloport support were used. The reaction products were thus shown to consist of 24 mole percent ethylcyclohexane and 76 mole percent ethylbenzene.

*Example 3.—Disproportionation of dipentene*

Fifteen milliliters (0.093 mole) of dipentene was reacted with 4.0 g. (0.022 mole) of palladium dichloride in the apparatus described in Example 1. The reaction temperature was 130–135° C. and the reaction time was 40 minutes. As in the previous examples, a black solid formed and hydrogen chloride was evolved. The cooled and filtered reaction products were shown by infrared absorption spectroscopy and vapor phase chromatography (2% Carbowax on Haloport) to contain p-cymene and 4 - isopropyl-1-methylcyclohexane. The infrared spectrum also revealed the complete absence of dipentene as evidenced by the disappearance of the double bond absorption band at 1648 cm.$^{-1}$ thus indicating a quantitative conversion of this material by palladium dichloride.

*Example 4.—Use of palladium metal as a disproportionation catalyst*

Fifteen milliliters of cyclohexene (0.149 mole) was reacted with 2.0 g. of palladium dichloride (0.011 mole) as described in Example 1. The black solid (palladium metal) which formed during the two hour reaction at 80–81° C. was isolated after cooling by filtration, washed with pentane and dried in air for one hour. A yield of 1.0 g. of palladium metal was obtained. The filtrate was shown by gas phase chromatography to consist of 67.5 mole percent cyclohexane and 32.5 mole percent benzene.

The black solid, palladium metal, was placed in the flask described in Example 1 together with 20 ml. of 4-vinylcyclohexane-1 (0.15 mole). Reaction was allowed to proceed for one hour at 135° C. The reaction products were shown to consist of 33 mole percent ethylcyclohexane and 67 mole percent ethylbenzene.

*Example 5.—Disproportionation of cyclohexadiene-1,3*

Fifteen milliliters of cyclohexadiene-1,3 (0.15 mole) was reacted with 2.0 g. (0.011 mole) of palladium dichloride in the equipment described in Example 1. After refluxing the reactants for 2 hours at 80–81° C. the cooled and filtered product was found by infrared absorption spectroscopy and gas phase chromatography (2% Carbowax on Haloport) to contain only two compounds, viz., cyclohexene and benzene. The infrared absorption spectrum revealed the absence of cyclohexadiene-1,3 from the disapperance of the double bond absorption band at 1608 cm.$^{-1}$ and the appearance of an absorption band at 1652 cm.$^{-1}$ characteristic of cyclohexene. As described in Example 4, cyclohexene can be further reacted to give benzene and cyclohexene.

*Example 6.—Formation of palladium metal on a support*

A mixture of 2.0 g. (0.011 mole) of palladium dichloride and 4.0 g. of calcium carbonate was placed in a 100 ml. round bottom flask equipped with a reflux condenser and stirrer and 20 ml. (0.198 mole) of cyclohexene added. The contents were heated at reflux temperature overnight and filtered. The precipitate was a finely divided black powder of palladium metal supported on calcium carbonate. This supported catalyst could be used for additional disproportionations of cyclohexene or other cyclic olefins.

*Example 7.—Disproportionation of 1-methylcyclohexene-1*

The equipment and procedure described in Example 1 was used with 0.130 mole of 1-methylcyclohexene-1 and 0.012 mole of palladium dichloride at 100–105° C. for 20 minutes. There was obtained a mixture identified by infrared and vapor phase chromatography as 37 mole percent toluene and 63 mole percent methylcyclohexane.

*Example 8.—Disproportionation of cyclohexene*

Using the equipment and procedure described in Example 1 with 15 ml. (0.15 mole) of cyclohexene and 1.09 (0.0038 mole) of platinous chloride afforded cyclohexane and benzene as the sole reaction products.

Although the invention is practiced at atmospheric pressures, subatmospheric or superatmospheric pressures can also be employed. Temperatures in the range of about 15° C. to 200° C. can be used with about 25° C. to 175° C. being a preferred range for both the disproportionation reaction and the formation of catalytically active metal.

The concentration of platinum metal halide used is not narrowly critical, catalytic amounts as well as greater amounts both being effective. At the high end of the concentration range, the mole ratio of platinum metal halide to olefin may be as high as 1:8, while at the low end only catalytic quantities, that is less than one part of platinum metal halide per 100 parts of olefin can be used. For reasons of economy, the preferred range utilizes a low ratio of metal halide to olefin so that it acts catalytically.

Although the invention has been described with a certain degree of particularity, it is understood that the present disclosure has been made only by way of example, and that numerous changes may be made without departing from the spirit and the scope of the invention.

What is claimed is:

1. A process for the disproportionation of cyclic olefins having 6 carbon atoms in the ring and unsubstituted sites available on said ring for hydrogen transfer which consists essentially of contacting said cyclic olefin with less than a stoichiometric amount of a halide of a platinum metal and then recovering the disproportionation products.

2. The process claimed in claim 1 wherein the disproportionation of cyclic olefins is carried out in the temperature range of about 20° C. to 200° C.

3. The process claimed in claim 1 wherein the disproportionation of cyclic olefins is carried out by contacting said cyclic olefins with a catalytic amount of a palladium halide.

4. The process claimed in claim 3 wherein the halide is a chloride.

5. The process claimed in claim 1 wherein the cyclic olefin is cyclohexene.

6. The process claimed in claim 1 wherein the cyclic olefin is cyclohexadiene-1,3.

7. The process claimed in claim 1 wherein the cyclic olefin is 1-methylcyclohexene-1.

8. The process for preparing a catalytically active form of a platinum metal which consists essentially of contacting a halide of said platinum metal with a stoichiometric quantity of a cyclic olefin having 6 carbon atoms in the ring and unsubstituted sites available on said ring for hydrogen transfer and then recovering the platinum metal.

9. The process claimed in claim 8 carried out at about 20° C. to 200° C.

10. The process claimed in claim 8 wherein the platinum metal is palladium metal and the halide is a chloride.

11. The process claimed in claim 8 carried out in the presence of a heterogeneous support.

12. A process for the hydrogenation of unsaturated aliphatic substituents, having 2 to 3 carbon atoms, situated on cyclic olefins, having 6 carbon atoms in the ring, which comprises contacting said substituted cyclic olefins with at least a catalytic amount of a halide of a platinum metal.

13. The process claimed in claim 12 wherein the platinum metal is palladium.

14. The process claimed in claim 12 wherein the substituted cyclic olefin is dipentene.

References Cited by the Examiner

N. D. Zelinskii et al.: Ber. 66B, pp. 1420–2, 1933.
Rudolf Huttel et al.: Ibid, 94, pp. 766–80, 1961.

DELBERT E. GANTZ, *Primary Examiner.*
V. O'KEEFE, *Assistant Examiner.*